Jan. 1, 1952   O. C. LYTLE   2,580,936
LATERALLY ADJUSTABLE OSCILLATING HOE
Filed May 3, 1949   2 SHEETS—SHEET 1
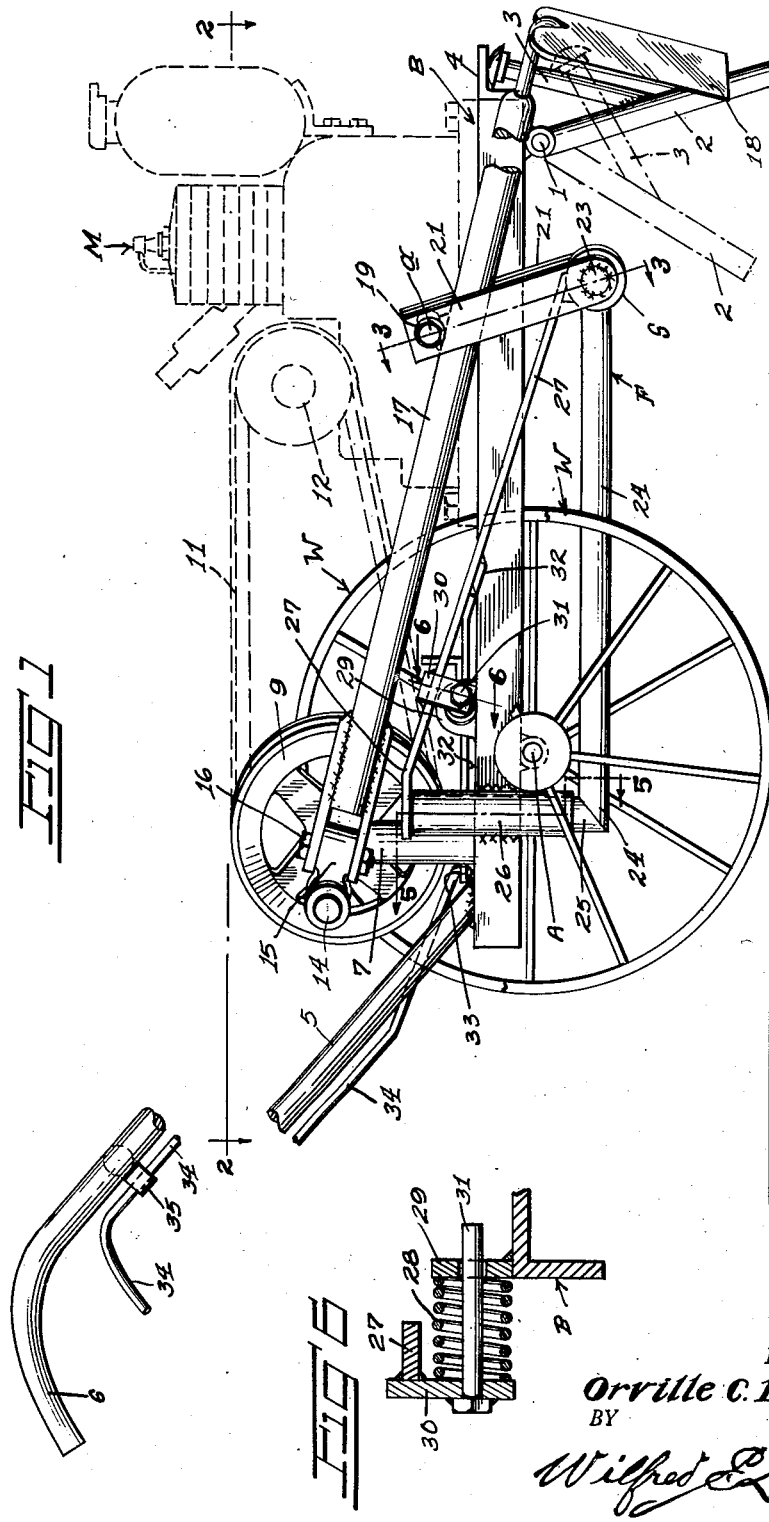
INVENTOR.
Orville C. Lytle
BY
Wilfred E. Lawson

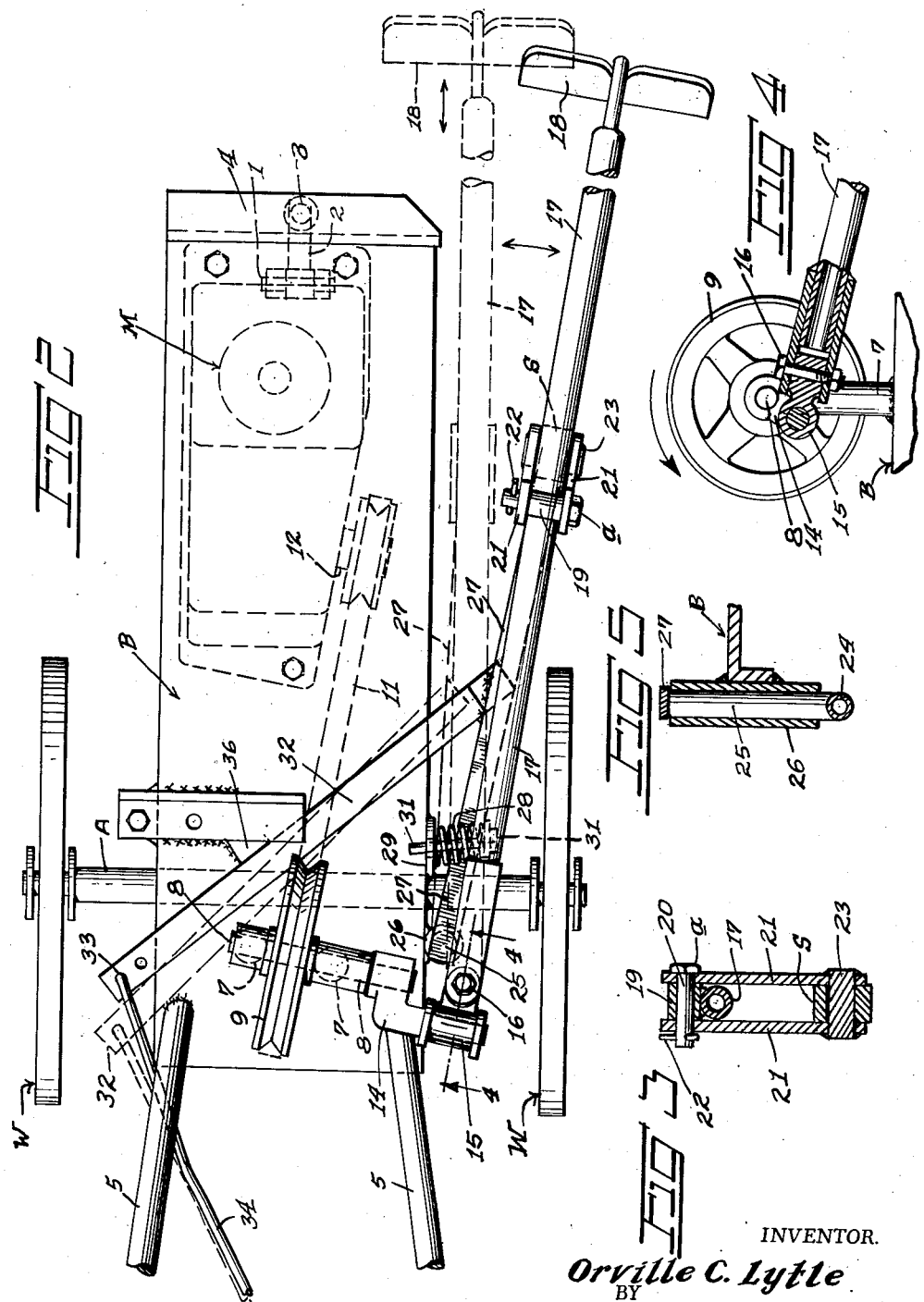

Patented Jan. 1, 1952

2,580,936

UNITED STATES PATENT OFFICE 2,580,936

LATERALLY ADJUSTABLE OSCILLATING HOE

Orville C. Lytle, Kittanning, Pa., assignor of one-half to William H. Campbell, Kittanning, Pa.

Application May 3, 1949, Serial No. 91,071

4 Claims. (Cl. 97—45)

This invention relates to a mechanical hoe or the like and it is particularly an object of the invention to provide an apparatus of this kind which can readily operate between plant rows or between plants of a row without changing the direction of travel of the apparatus.

It is also an object of the invention to provide an apparatus of this kind including a ground working member operating in a manner to provide means to cause forward travel of the apparatus when in use.

Furthermore it is an object of the invention to provide an apparatus of this kind comprising a portable body carrying an oscillating ground work member together with power means for operating said member in a manner whereby the member not only works the ground but operates to forward propel the apparatus.

A still further object of the invention is to provide an apparatus of this kind including a portable body and a power driven ground working member adjustable laterally at the will of the operator to work between plant rows or between adjacent plants of a row.

The invention consists in the details of construction and in the combination and arrangement of the several parts of my improved mechanical hoe whereby certain advantages are attained, as will be hereinafter more fully set forth.

In order that my invention may be better understood, I will now proceed to describe the same with reference to the accompanying drawings, wherein:

Figure 1 is a view in side elevation of an apparatus constructed in accordance with an embodiment of the invention, the power driving means being indicated by broken lines, and a portion being broken away;

Figure 2 is a view in top plan with parts in section as indicated by line 2—2 of Figure 1;

Figure 3 is a detail sectional view taken substantially on the line 3—3 of Figure 1;

Figure 4 is a detail sectional view taken substantially on the line 4—4 of Figure 1;

Figure 5 is a detail sectional view taken substantially on the line 5—5 of Figure 1; and Figure 6 is a detail sectional view taken substantially on the line 6—6 of Figure 1.

In the embodiment of the invention as illustrated in the accompanying drawings, B denotes an elongated and relatively narrow flat body or platform. The rear portion of the body or platform B carries a transversely disposed axle A extending a material distance beyond each side of the body or platform B. The extremities of the axle A carry the ground engaging wheels W which may be of any type preferred.

The forward portion of the body or platform B in advance of the axle A has mounted thereon a suitable motor M, such as an internal combustion engine, which is indicated in the drawings by broken lines. Pivotally engaged, as at 1, to the forward extremity of the body or platform B, and preferably at substantially the transverse center thereof, is the upper end portion of a prop leg 2. This leg 2 is freely mounted and when the machine is at a standstill, said leg swings downwardly past vertical center to engage the ground or other surface to support the forward portion of the body or platform B. This is of particular advantage in starting the motor M.

The prop leg 2 is provided with an upwardly and forwardly inclined arm 3 which connects from below with a forwardly directed flange or part 4 carried by the front end of the body or platform B. This arm 3 is of such length and on such an angle with respect to the leg 2 to limit the extent of the swinging movement of the leg 2 beyond the center and to assure the desired support for the front end of the body or platform B.

When the machine is in use the front end of the body or platform B will be raised whereby the leg 2 will automatically assume and maintain an inoperative position, as indicated by broken lines in Figure 1.

The front end of the body or platform B is raised by depressing the rear portion or that part behind the axle A. In the present embodiment of the invention, this is done by the upwardly and rearwardly inclined handle members 5 carried by the rear extremity of the body or platform B and suitably spaced transversely thereof. The operator walks between the handle members 5 and grips the hand grasps 6 at the upper or free portions of the handle members. At this time it is to be stated that in a working operation, the apparatus is not moved by the operator and the handle members 5 are only used to control the direction of travel of the apparatus or to depress the rear of the platform or body B when desired.

The body or platform B rearwardly of the axle A is provided with the two upstanding bearing parts 7 spaced transversely of the body or platform B with one part positioned a desired distance in advance of the other. These parts 7 rotatably support a shaft 8 to which is fixed between the parts 7 a pulley 9 which is adapted for driven engagement, as by a belt 11, with the drive shaft 12 of the motor M.

The shaft 8 extends to one side of the body or platform B and said extended portion carries a crank 14 of required throw which rotatably carries a sleeve 15. Pivotally engaged, as at 16, to the sleeve 15 is the inner extremity of a rod 17, herein disclosed of a length to extend at all times in advance of the forward end of the body or platform B. In the present embodiment of the invention, the outer extremity of the rod 17 carries a hoe blade 18.

The pivotal connection 16 allows the rod 17 to have laterally swinging movement with respect to the body or platform B and it is to be noted that such connection 16 is of a type to permit ready application or removal of the rod 17. This is of an advantage as ground working tools other than a hoe may be readily used when desired.

At a desired point intermediate its ends, the rod 17 has rigid therewith a transversely disposed sleeve 19, said sleeve 19 being substantially at right angles to the rod 17 positioned on top thereof. Freely disposed through this sleeve 19 is a headed shank 20. This shank 20 is also freely disposed through the upper extremities of the rigid links 21. The shank 20 is held in place by a cotter pin 22 or other removable holding element which is positioned outwardly of the adjacent links 21. The head $a$ of the shank 20 is positioned outwardly of the second link.

The lower extremities of the links 21 have rigid therewith as by welding, the end portions of a pin 23 bridging the space between the links 21. This pin 23 is freely extended through a sleeve S rigid with the forward and free end portion of a frame F. This frame F includes a straight and lower rigid member 24 and its rear end portion is provided with an upstanding cylindrical arm 25 which extends up from below through a vertically directed bearing sleeve 26 rigidly attached to the side face of the body or platform B adjacent to the arm 25 of the frame F. Rigid with the upper extremity of the arm 25 is the rear end portion of a rigid bracing strap 27 having contact from above with the upper end of the sleeve 26. The strap 27 extends forwardly and downwardly and has its front end portion rigid with the adjacent end portion of the member 24.

The frame F as a unit has lateral swinging movement with respect to the body or platform B and is positioned to one side thereof so that the rod 17 which swings with the frame F may be readily adjusted to have the hoe blade 18 work between adjacent plants of a row or to work between adjacent rows as may be desired by the operator.

The frame F is normally maintained in an outwardly and forwardly inclined position to permit the blade 18 to work between adjacent plants of a row. This position is maintained by an expansible member 28 of required tension interposed between a bracket plate 29 extending up from the adjacent side marginal portions of the body or platform B and a bracket plate 20 depending from the strap 27. The expansible member 28 is herein disclosed as a coil spring and is positioned closely adjacent to and in advance of the mounting arm 25 of the frame F.

An elongated pin 31 is rigid with the bracket plate 30 and is at all times freely disposed through the bracket plate 29. This pin is also positioned substantially axial of the spring 28.

Rigid with the central portion of the strap 27 is an inwardly directed arm 32 which extends across the body or platform B closely adjacent thereto. This arm 32 is of a length to extend beyond the side of the body or platform B and this extended or free end portion of the arm 32 has pivotally engaged therewith, as at 33, an end portion of a rod 34. This rod 34 extends upwardly and rearwardly from the arm 32 and in a direction to have its outer free end portion slidably disposed through a guide bracket 35 extending downwardly from the outer or upper end portion of the handle member 5 at the side of the body or platform B remote from the outer or free end of the arm 32. By this arrangement substantially a straight pull will be made by the operator, when it is desired to swing the frame F and the blade 18 into a position between adjacent plant rows.

During a working operation, the machine is not pushed by the operator but the desired travel is affected only by the pull resulting through the rod 17 as the blade 18 or other ground working tool intermittently engages the ground as the rod 17 is oscillated. The operator can hold back the machine when it is desired to continue a working operation on the ground at a selected spot and the handle member 5 can be readily used by the operator to control the direction of forward travel of the machine.

Normally the frame F is in a position to allow the ground working member 18 to be effective between adjacent plant rows but when desired to work between adjacent plants of a row, the member 18 can easily and readily be adjusted into required position by an imposing push upon the rod 34.

The outward movement of the frame F under the action of the expansible member or spring 28 is limited by contact of the arm 32 with the stop 36 suitably placed on body or platform B.

From the foregoing description it is thought to be obvious that a mechanical hoe constructed in accordance with my invention is particularly well adapted for use by reason of the convenience and facility with which it may be assembled and operated.

I claim:

1. A ground working apparatus comprising a portable body, a frame portion to one side of the body, means for pivotally supporting the rear portion of the frame from the body, manually operable means for pivoting said frame laterally toward or away from the body, means normally maintaining the frame in a position away from the body, a rigid linkage rising from the outer portion of the frame, an elongate rod supported adjacent to one end from the linkage, a ground working member carried by the rod at said end thereof, a driven means supported on the body and connected with the other end of said rod for oscillating the latter, said linkage guiding the rod in its oscillatory movement, and means for applying power to said driven means.

2. A ground working apparatus as set forth in claim 1 wherein the means for pivoting the frame laterally comprises an arm carried by the frame and extending therefrom over the body, and a manually operable rod secured to said arm, whereby movement of the rod in one direction swings the arm to move the frame inwardly.

3. A ground working apparatus as set forth in claim 1 wherein the means for pivoting the frame laterally comprises an arm carried by the frame and extending therefrom over the body, a manually operable rod secured to said arm, whereby movement of the rod in one direction swings the arm to move the frame inwardly, and a stop means on the body contacted by the arm to limit the extent of outward swinging movement of the frame.

4. A ground working apparatus comprising a portable body, a frame portion to one side of the body, means for pivotally supporting the rear portion of the frame from the body, manually operable means for pivoting said frame laterally toward or away from the body, a rigid linkage rising from the outer portion of the frame, an elongate rod supported adjacent to one end from the linkage, a ground working member carried by the rod at said end thereof, a driven means supported on the body and connected with the other end of said rod for oscillating the latter, said linkage guiding the rod in its oscillatory movement, and means for applying power to said driven means.

ORVILLE C. LYTLE.

REFERENCES CITED

The following references are of record in the file of this patent:

UNITED STATES PATENTS

| Number | Name | Date |
| --- | --- | --- |
| 1,631,032 | Hellums | May 31, 1927 |
| 1,636,418 | Hejma | July 19, 1927 |
| 2,169,079 | Bosworth et al. | Aug. 8, 1939 |
| 2,314,035 | Dontje | Mar. 16, 1943 |